April 22, 1930. W. O. SMITH 1,755,275
BEARING
Filed Feb. 25, 1928
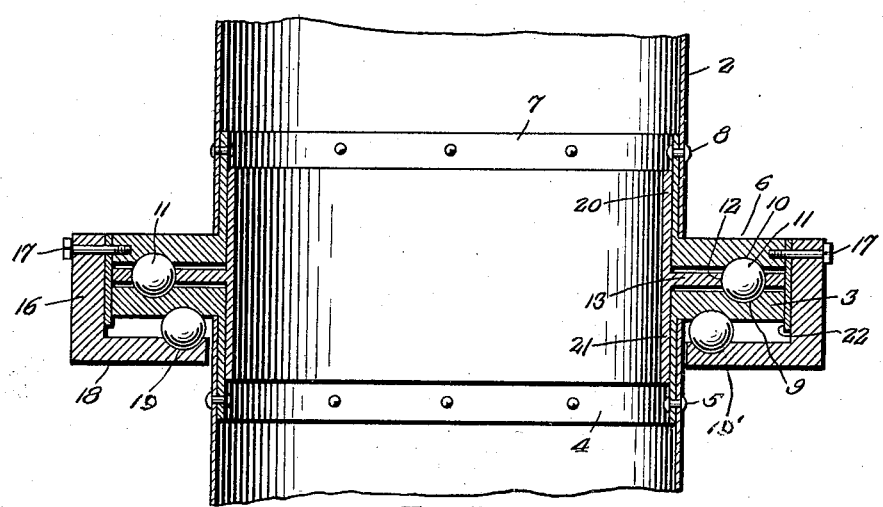
Fig. 1.
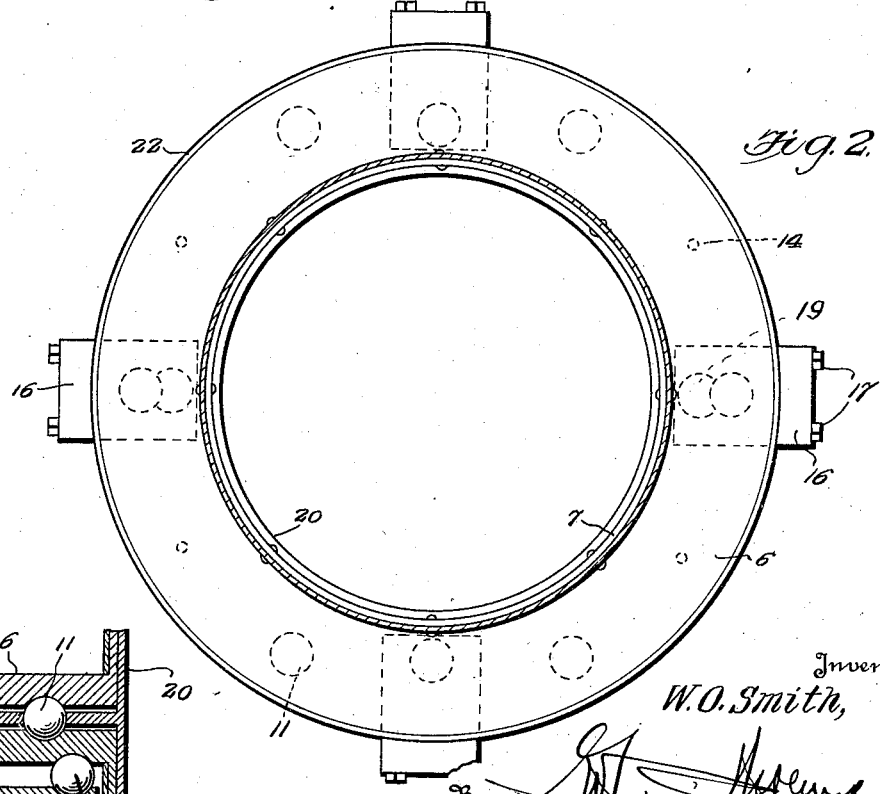
Fig. 2.
Fig. 3.
Inventor
W. O. Smith,
By
Attorney Patented Apr. 22, 1930

1,755,275

UNITED STATES PATENT OFFICE

WILLIAM O. SMITH, OF WILKINSBURG, PENNSYLVANIA, ASSIGNOR OF ONE-HALF TO JOHN CLIFFORD YOUNG, OF PITTSBURGH, PENNSYLVANIA

BEARING

Application filed February 25, 1928. Serial No. 256,957.

This invention relates to ball bearings.

One object of the invention is to provide a bearing structure for and especially applicable to chimney or other ventilators to provide for a free and easy rotation of a rotatable part of the ventilator.

Another object of the invention is to provide a ball bearing structure particularly adapted for association in any structure involving a fixed and a rotatable part where it is desired that the rotatable part revolve with as little friction as possible.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:—

Figure 1 is a longitudinal sectional view through two tubular members, one fixed and the other rotatable and with my improved bearing interposed between said tubular members.

Figure 2 is a horizontal sectional view.

Figure 3 is a fragmentary transverse sectional view through a modified form of bearing.

Referring now more particularly to the accompanying drawings, the reference character 1 indicates a fixed tubular stem and the character 2 denotes a rotatable tubular member disposed axially with relation to the stem and spaced therefrom.

My improved bearing is interposed between the aforesaid stem and tubular member and by reference to the accompanying drawing, the bearing will be comprehended, there being an annular ring 3 secured in any suitable manner to the tubular stem 1. This ring 3 is provided with an annular flange 4 which fits within the stem 1 and which is riveted or otherwise secured therein at 5. A similarly formed annular ring 6 is provided and it has a flange 7 which fits within the tubular member 2 and secured therein by means of rivets 8 or otherwise.

The lower ring 3 is provided on its upper face with an annular groove 9 adapted to align with a similarly formed groove 10, formed in the underface of the complementary ring 6 to form a raceway for bearings, such as the bearings 11 disposed in the apertures 12 of a ball retainer 13 interposed between the rings 3 and 6, the lower ring 3 having spaced apertures 14 therein at spaced intervals leading from the groove 9 to effect discharge of water or any other foreign matter which might find its way into the bearing.

A ball retainer 13 is interposed between the annular rings 3 and 6 and has equidistantly spaced apertures 12 formed therein to receive the bearing balls 11 which are preferably of a diameter slightly greater than the diameter of the apertures 14 so as to support the retainer spaced from the lower ring 3 and yet permit the balls to roll in the raceway formed by the opposing grooves 9 and 10 formed in the rings 3 and 6 respectively.

To hold the rings 3 and 6 together with relation to the retainer 13 and balls 11, any suitable means may be provided, but as shown, there are a plurality of elements, each preferably L-shaped, and each having one arm 16 secured by fastenings 17 to the outer edge of the annular ring 6 and having its other arm 18 extending under the lower ring 3 and provided with pockets 19 to receive bearing balls 19' bearing against the under face of the ring 3 whereby to effectively connect the rings 3 and 6 together. Any suitable number of these L-shaped elements may be employed, as will be understood.

The retainer 13 may be T-shaped in cross section if desired, and as shown, providing the retainer 13 with upper and lower flanges 20 and 21, respectively, so that if the bearing is used in connection with a chimney ventilator as is proposed in one application of the present invention, the flanges 20 and 21 will serve as a protection to the bearing against the contents of the chimney, and also act, in any event, as in inner support between the members 1 and 2.

If desired, a thin collar 22 may be interposed between the outer edges of the annular rings 3 and 6 and the arms 16 of the L-shaped clamping elements so as to exclude water, snow and ice from the interior of the bearing. This collar 22 may be secured to the upper annular ring 6 by the fastening 17 which secure the L-shaped connecting or holding elements to the upper ring 6. The connection of the collar 22 and the holding elements to the upper ring 6 is such as not to interfere with a free rotation of the tubular member 2.

In Fig. 3, the bearing is shown as modified slightly, that is, the upper annular ring 6 is provided with a continuous annular flange 23 to the lower edge of which arms 24 may be secured by suitable fastenings 25. These arms 24, in Fig. 3 will take the place of the holding devices previously described, the same carrying balls 26 bearing rotatably against the under face of the ring 3. This modified structure in Fig. 3 shields and protects the interior of the bearing from dirt, water, snow and ice.

From the foregoing, it will be seen that I provide a simple, inexpensive, durable and efficient ball bearing device, which may be readily interposed between two tubular members as proposed in the accompanying illustration, and that the bearing embodies such characteristics that it is readily applicable in other relations other than that herein specifically noted, and it will be understood that in the accompanying claims, I am not intentionally limiting myself to the application of the ball bearing to any particular art, although I state that it is efficient in application to ventilators of various types, particularly that of chimney and stack ventilators.

What is claimed is:

1. In a ball bearing mounting, the combination with oppositely disposed tubular members, of annular rings connected one to each of the aforesaid members, said rings having opposed annular grooves, the groove of the lower ring having openings leading therefrom, a retainer interposed between said rings and having equidistantly spaced apertures and also provided with flanges overlapping the respective first-mentioned members interiorly of the latter, bearing balls in said apertures of the retainer to run in said opposed grooves of the rings under the influence of rotation of one of the tubular members and to maintain the retainer spaced from the lower ring, and devices secured to the upper ring and carrying parts extending under and engaging the lower ring to secure the rings together.

2. A ball bearing comprising a pair of annular rings provided with opposing annular grooves, bearing elements mounted in said grooves, a retainer interposed between said rings and carrying said bearing elements, and a plurality of devices rigidly but detachably secured to one of said rings and carrying an element bearing slidably against the other ring whereby to secure the parts together in operative relation.

3. A ball bearing comprising a pair of annular rings provided with opposing annular grooves, bearing elements mounted in said grooves, a retainer interposed between said rings and carrying said bearing elements, and a plurality of devices secured to one of said rings and overlapping the edge and a horizontal face of the other ring and engaging said horizontal face of the other ring to secure the rings in operative relation.

4. A ball bearing comprising a pair of rings having opposed annular grooves, the groove of the lower ring having drain openings leading therefrom, bearing elements mounted in the opposing grooves of the rings, and a plurality of fastening devices rigidly secured to one of the rings and bearing slidably against a horizontal wall of the other ring to secure the parts together in operative relation.

5. A ball bearing comprising a pair of rings, bearing elements mounted between the rings, and a plurality of L-shaped clamping devices, each having one arm rigidly secured to one ring, and having its other arm carrying a bearing element which bears slidably against the other ring, whereby to secure the parts rotatively together, and a collar interposed between the rings.

6. A ball bearing comprising a pair of annular rings provided with opposing annular grooves, bearing elements mounted in said grooves, a retainer interposed between said rings and carrying said bearing elements, a plurality of devices rigidly connected to one of said rings and bearing slidably against the other ring, whereby to secure the parts together in operative relation, and a collar interposed between the rings and said devices.

7. A ball bearing comprising a pair of annular rings provided with opposing annular grooves, bearing elements mounted in said grooves, a plurality of angularly shaped devices, elements for securing said angularly shaped devices detachably to one of the rings, the angularly shaped portions carrying parts slidable against the other ring, whereby to secure the parts together in operative relation, to groove of the lower ring having openings leading therefrom.

8. A ball bearing comprising a pair of annular rings provided with opposing annular grooves, bearing elements mounted in said grooves, a plurality of angularly shaped devices, elements for securing said angularly shaped devices detachably to one of the rings, the angularly shaped portions carrying parts slidable against the other ring, whereby to secure the parts together in operative relation, the groove of the lower ring having openings leading therefrom, and a collar interposed between the rings and said angularly shaped devices and secured against displacement by the elements which secure the angularly shaped elements to one of said rings.

In testimony whereof I have hereunto set my hand.

WILLIAM O. SMITH.